United States Patent [19]

Diep et al.

[11] Patent Number: 4,776,889
[45] Date of Patent: Oct. 11, 1988

[54] WAXES AS A BLACK LIQUOR VISCOSITY MODIFIER

[75] Inventors: Daniel V. Diep, Aurora; Nicholas J. Furibondo, Naperville, both of Ill.

[73] Assignee: Nalco Chemical Company, Naperville, Ill.

[21] Appl. No.: 116,828

[22] Filed: Nov. 5, 1987

[51] Int. Cl.$^4$ ...................... C08L 97/02; D21C 11/12
[52] U.S. Cl. ............................... 106/123.1; 162/30.11
[58] Field of Search ........................... 106/123.1, 271; 162/30.11, 16, 17

[56] References Cited

U.S. PATENT DOCUMENTS 4,517,052  5/1985  Choy ..................................... 162/16
4,682,985  7/1987  Kohl .................................. 162/30.11

FOREIGN PATENT DOCUMENTS 125614  10/1947  Australia ........................... 106/123.1

OTHER PUBLICATIONS

Chem Abst: 62:730c.
Industrial Waxes, vol. II, H. Bennett, published by Chemical Publishing Co., Inc., 1963.
The Chemistry & Technology of Waxes, A. H. Warth, published by Reinhold Publishing Corp., 1956.
Kirk-Othmer Encyclopedia of Chemical Technology, Third Edition, vol. 24, published by John Wiley & Sons, 1983.

Primary Examiner—Theodore Morris
Attorney, Agent, or Firm—John G. Premo; Anthony L. Cupoli; Donald G. Epple

[57] ABSTRACT

Black liquor is rendered more pumpable by reducing its viscosity by adding to the black liquor at least a part per million of a wax based on the solids present in the black liquor.

7 Claims, 1 Drawing Sheet

BLACK LIQUOR DRAG TEST RIG

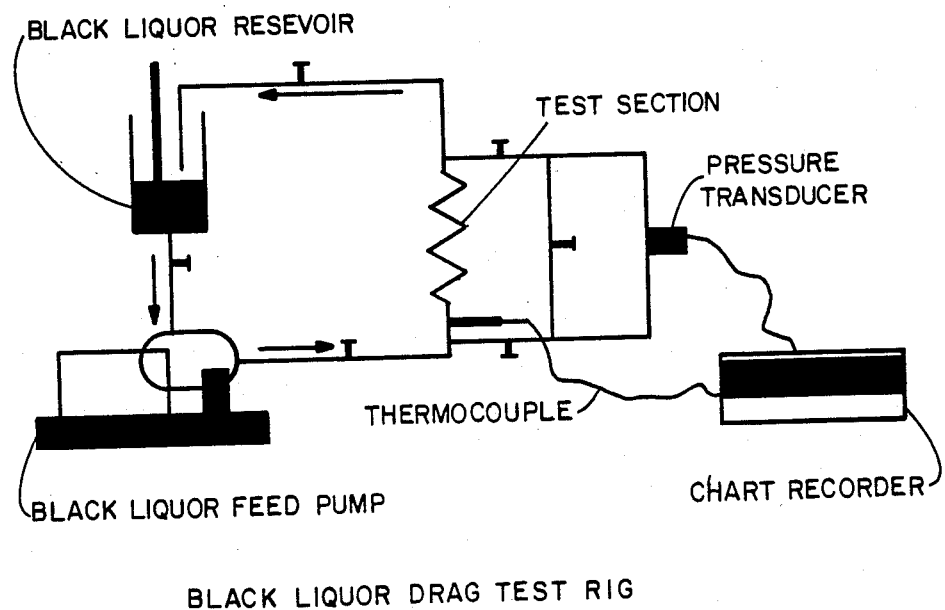
BLACK LIQUOR DRAG TEST RIG

WAXES AS A BLACK LIQUOR VISCOSITY MODIFIER

INTRODUCTION

In a Kraft pulp mill, the chemical recovery system is a basic segment of the pulping operation. The main unit of these systems is a chemical recovery boiler. The essential function of the recovery boiler is to reduce the sodium sulfate in the black liquor to sodium sulfide for later use as a cooking liquor in a digester. The organic liquor constituent dissolved from the wood is burned off and the energy is recovered in production of steam. Maximum recovery of heat and chemical values as well as in minimizing the release of obnoxious wastes by the recovery boiler is a vital part of the pulping operation.

Energy saving, safety, and abatement of pollution can be best improved for boiler operation by firing a more concentrated liquor in the recovery boilers. However, the main limiting factor for burning high solids content liquor is its viscosity or flow friction (drag) which can cause pluggage of the liquor transport lines, the spray nozzles, and a decrease in the capacity of the pumps. The phenomenon of turbulent flow drag reduction can be identified as an increase in the volumetric flow rate at a given pressure drop or a decrease in pressure drop at a given flow rate.

THE INVENTION

The invention comprises rendering a black liquor more pumpable by reducing its viscosity or friction to flow (drag) by adding to the black liquor at least one ppm of a wax. The dosage may be varied and is based upon the solids present in the black liquor. While good results may be obtained using as little as 1 ppm, a typical dosage range would be between 25–150 ppm and preferably within the range of 25–50 ppm.

THE WAXES

The waxes may be either natural waxes or synthetic waxes. Preferably, the waxes are predominantly hydrocarbon in nature and contain only at most a small percentage of polar groups such as O, OH, COOH and the like.

THE NATURAL WAXES

These waxes include the insect, animal and vegetable waxes. Typical of such waxes are: spermaceti, candelilla, carnauba, Japan, beeswax, ouricury wax, Douglas-Fir bark wax, rice-bran wax, Jojoba, castor wax, bayberry wax, montan wax, peat waxes, ozokerite and ceresin waxes.

Included also within this classification are the well-known petroleum and mineral waxes. These petroleum waxes are of three basic types: paraffin, microcrystalline and semi-microcrystalline. Typical properties of paraffin and microcrystalline waxes are set forth below:

| Property | Paraffin | Microcrystalline |
| --- | --- | --- |
| flash point, °C. | 204, min | 260, min |
| viscosity at 98.9° C., mm$^2$/s(SUs) | 4.2–7.4 (40–50) | 10.2–25 (60–120) |
| melting range, °C. | 46–68 | 60–93 |
| refractive index at 98.9° C. | 1.430–1.433 | 1.435–1.445 |
| average mol wt | 350–420 | 600–800 |
| carbon atoms per molecule | 20–36 | 30–75 |
| other physical aspects | friable to crystalline | ductile-plastic to tough-brittle |

Examples of synthetic waxes are the following: oxidized polyethylene waxes, Fischer-Tropsch waxes, chemically modified hydrocarbon waxes, and substituted amide waxes.

Another group of synthetic waxes that may be used in the invention, although they are the least desirable, are the synthetic water-soluble waxes which are illustrated by the waxy polyoxyethylene glycols illustrated by the Carbowax waxes or polyoxy resins sold by Union Carbide.

While any number of waxes may be used as produced, a preferred embodiment of the invention is the use of the waxes in the form of an emulsion. The preferred emulsions are those of the oxidized polyethylene waxes and the natural wax emulsions such as carnauba wax emulsions. A typical oxidized polyethylene emulsion uses as the polyethylene wax portion thereof a product known as Epolene waxes. These products have molecular weights within the range of 2,000–6,000.

Another type of oxidized polyethylene wax emulsion is the emulsion that uses A-C Polyethylene waxes. These waxes are sold by Allied Chemical Company. A typical emulsion of such waxes is presented below:

| Proportions for Emulsions | |
| --- | --- |
| A-C Polyethylene 629 | 40 |
| Oleic Acid | 8 |
| Morpholine | 8 |
| Water | 184 |

The emulsions of carnauba wax, a preferred wax, are prepared by melting carnauba wax and blending it into water with the use of high-speed agitation.

The particle size of the wax in the emulsion should be as small as possible. Preferred oxidized polyethylene emulsions should have wax particles sizes less than one micron and up to 5 microns. Typically, the wax particles in the emulsions should not exceed 50 microns in particle size.

The emulsions used in the practice of the invention contain between as little as 10 up to about 60% by weight of the wax. The concentration of the wax in the emulsion is not critical. For a more detailed description of waxes discussed, see *Industrial Waxes*, Vol. II, H. Bennett, published by Chemical Publishing Co., Inc., 1963; *The Chemistry and Technology of Waxes*, A. H. Warth, published by Reinhold Publishing Corp., 1956; and *Kirk-Othmer Encyclopedia of Chemical Technology*, Third Edition, Vol. 24, Published by John Wiley & Sons, 1983, all of which are incorporated herein by reference.

EVALUATION OF THE INVENTION

A. Brookfield Viscometer

The viscometer measures viscosity by measuring the force required to rotate a spindle in the fluid. Testing procedures can be found in the manufacturers' instruction manuals which are incorporated herein by reference.

B. Drag Reducing Test Rig

The test was designed to simulate the flow of black liquor with regard to the liquor temperature, pressure drop across the test section, and the liquor concentration. This laboratory friction loop produced the differential pressure between the inlet and outlet of a flowing black liquor in the small diameter (⅛" tube) stainless steel tube.

Drag reduction is measured as the percentage difference between a pressure without a drag reduction additive (100% friction) vs. the liquor's pressure measurement with additives. The general arrangement of the test rig is shown in the drawing. The apparatus consists of four main parts:

- black liquor pump
- test section
- pressure transducer/recorder
- black liquor reservoir/temperature controller Liquor was heated to the operating temperature (200°–260° F.) by the electric heated tapes wrapping around the feed line. Liquor pressure (18–35 psi) was obtained by adjusting the liquor flow as well as its temperatures. Pressure drops of the blank and treated samples were measured after the steady state condition which is a condition of constant liquor temperature and pressure. The results of viscosity and drag reduction are tabulated in Table I.

The polyethylene emulsion tested was the Epolene· wax, previously described, having a particle size of less than one micron and a total solids content of about 25%. The specific composition of this emulsion is set forth below:

|  | Parts by Weight |
|---|---|
| Epolene wax | 40 |
| Igepal CO-630 surfactant[1] | 6 |
| Igepal CO-730 surfactant[1] | 6 |
| KOH | 1 |
| Sodium meta-bisulfite | 0.4 |
| Water | 80 |

Using the above test method and this emulsion, the following results were obtained and are set forth below in Tables I and II.

TABLE I

| Dosage (ppm) | % Reduction |
|---|---|
| I. Viscosity Reduction (Brookfield Viscometer) | |
| 25 | 8 |
| 50 | 17 |
| 100 | 22 |
| II. Drag Reduction | |
| 25 | 10 |
| 50 | 23 |
| 100 | 32 |

[1]IGEPAL CO-630/730 is nonylphenoxypoly (ethyleneoxy) ethanol

TABLE II

| Wax Type | Dosage | % reduction in viscosity (Brookfield's) | % Drag Reduction |
|---|---|---|---|
| Paraffin | 100 ppm | 18 | 26 |
| Carnauba | 100 ppm | 16 | 23 |
| Stearate | 100 ppm | 15 | 20 |
| Carbowax | 100 ppm | 12 | 15 |

Having thus described our invention, we claim:

1. A method for improving the flow of high solids content black liquor which comprises treating the black liquor with at least one part per million of a wax and then flowing the thus-treated black liquor through transport lines.

2. The method of claim 1 where the wax is an emulsified synthetic wax.

3. The method of claim 2 where the synthetic wax is an oxidized polyethylene wax.

4. The method of claim 1 where the wax is an emulsified natural wax.

5. The method of claim 4 where the natural wax is carnauba wax.

6. The method of claim 4 where the natural wax is a paraffin wax.

7. The method of claim 1 where the synthetic wax is an oxidized polyethylene wax.

* * * * *